United States Patent [19]

Bricker et al.

[11] 4,184,573

[45] Jan. 22, 1980

[54] DOUBLE-ACTING DISC BRAKE HAVING FLOATING CYLINDER HEAD

[75] Inventors: Jack E. Bricker; Rene G. Galmiche, both of Hagerstown, Md.; Donald R. Pottorff, Mercersburg, Pa.

[73] Assignee: Walter Kidde & Company, Inc., Clifton, N.J.

[21] Appl. No.: 948,743

[22] Filed: Oct. 5, 1978

[51] Int. Cl.² .............................................. F16D 65/24
[52] U.S. Cl. .................................. 188/170; 188/106 P
[58] Field of Search .............................. 188/72.3–72.5, 188/106 P, 170, 171; 192/91 R

[56] References Cited

U.S. PATENT DOCUMENTS

| 2,342,750 | 2/1944 | Newell | 188/170 X |
| 3,680,666 | 8/1972 | Sommer | 188/170 |

Primary Examiner—Duane A. Reger
Attorney, Agent, or Firm—Brady, O'Boyle & Gates

[57] ABSTRACT

A disc brake primarily for use in a power transmission train between a drive motor and a gear speed reducer features a standardized compact and simplified hydraulic module containing a single piston and a coacting floating cylinder head and an adjusting collar to regulate the movement of the piston. The standardized module is compatible with and operationally connectable to a variety of brake disc assemblies of differing size and torque arresting capacity. The disc brake is biased "on" by constantly acting spring means behind the piston in the hydraulic module when the hydraulic system is depressurized. The brake also possesses a fail-safe capability and has a very desirable "soft feel" during operation due to hydraulic cushioning between the piston and floating cylinder head.

12 Claims, 2 Drawing Figures

DOUBLE-ACTING DISC BRAKE HAVING FLOATING CYLINDER HEAD

CROSS-REFERENCE TO RELATED APPLICATION

This application contains subject matter in common with prior copending application Ser. No. 810,511, filed June 27, 1977, for DOUBLE-ACTING DISC BRAKE.

BACKGROUND OF THE INVENTION

The invention herein pertains to that class of disc brake which is commonly employed in power transmission trains between a primary drive motor and a transmission or speed reduction gear. A typical application of the invention is in connection with the boom supporting turntable of a hydraulically operated construction crane, although the invention is capable of more generalized utility.

The present invention seeks to improve on the construction in the above-referenced application in terms of simplicity, compactness and economy without loss of the main advantages inherent in the structure in the prior application including fail-safe capability of the brake, biasing of the brake to an "on" condition when the hydraulic system is depressurized and the absence of a jerky mode of operation of the brake. An important aspect of this invention involves the utilization within a standardized hydraulically powered brake operating and adjusting module of a single piston and piston travel adjusting collar, and a uniquely arranged floating cylinder head which serves several useful purposes in the overall operation of the disc brake.

The standardized hydraulic module is adaptable to and useable with various forms and sizes of coacting brake disc assemblies, thereby enhancing the range of utility of the overall invention and its operational flexibility.

Other and more specific features of the invention will be apparent to those skilled in the art during the course of the following description.

The following United States patents Nos. are made of record herein under 37 C.F.R. 1.56:

3,500,970—Mar. 17, 1970—Schilling
3,680,666—Aug. 1, 1972—Sommer

While the Schilling patent discloses a spring-biased disc brake with fluid pressure release and a piston configuration similar to the piston utilized in this invention, Schilling does not include a floating type cylinder head nor does Schilling possess a mode of operation in the overall similar to the invention.

Sommer also shows a similar piston configuration and spring-biased means in a disc brake but the overall structure is much more complex and bulky than the comparable structure in this invention and the mode of operation in this invention is not achieved and cannot be achieved. No known prior art discloses the present combination of a floating cylinder head, coacting single piston and adjusting collar to regulate the travel of the piston in a standardized disc brake hydraulically powered module with fail-safe capability, improved operational "feel" and compatibility with a variety of brake disc assemblies.

DETAILED DESCRIPTION

Figure 1:
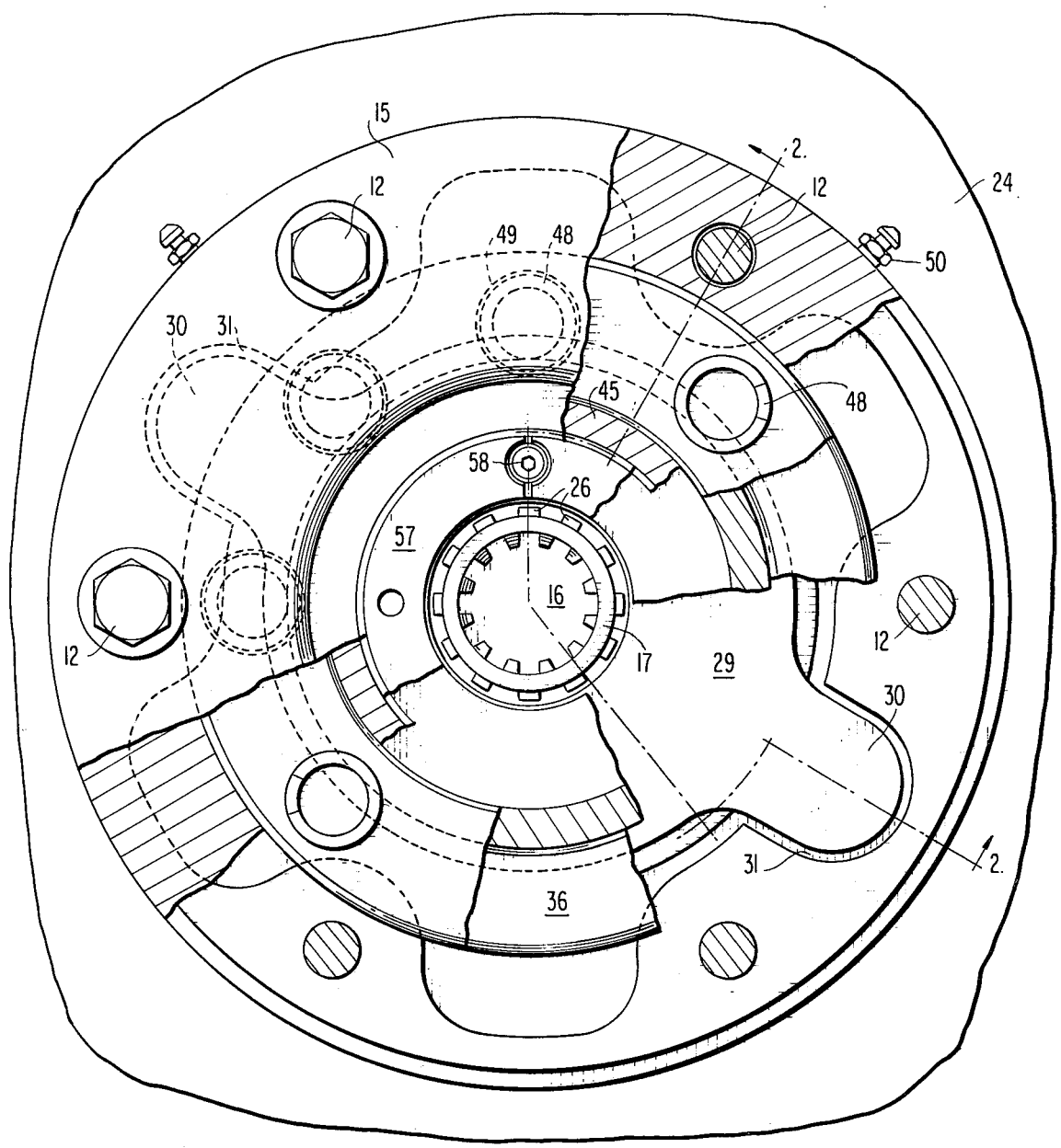
FIG. 1 is an end elevation, partly in section, and partly broken away, of a disc brake embodying the invention.

Referring to the drawings in detail wherein like numerals designate like parts, a disc brake 10 consists of a standardized hydraulic power module 11, or sub-assembly, adapted for coupling by perimeter bolts 12 to a brake disc module or sub-assembly 13. The standardized module 11 can be used with a variety of disc sub-assembly configurations, sizes and torque resisting capacities, rendering the invention versatile and increasing its range of utility.

The disc brake is normally employed in a power transmission train such as the power train for driving and controlling the turntable of a hydraulic construction crane. The invention is also capable of more generalized usage.

In the embodiment shown, a hydraulic drive motor 14 is suitably coupled with a housing section 15 which is the housing of the standardized module 11. The motor 14 has a splined rotary output shaft 16 received within an internally splined coupling end portion 17 of a disc brake rotor shaft 18 journaled in a bearing 19 within a housing section 20 which is the housing of the particular brake disc sub-assembly 13 being utilized in the disclosed embodiment of the invention. A suitable seal 21 is provided in the housing section 20 outwardly of the bearing 19. A splined end portion 22 of the rotor shaft 18 projects outwardly of housing section 20 and is coupled with an internally splined rotary input shaft 23 of a gear speed reducer, such as a planetary transmission having a housing 24 coupled by screws 25 with a flange of the housing section 20.

Figure 2:
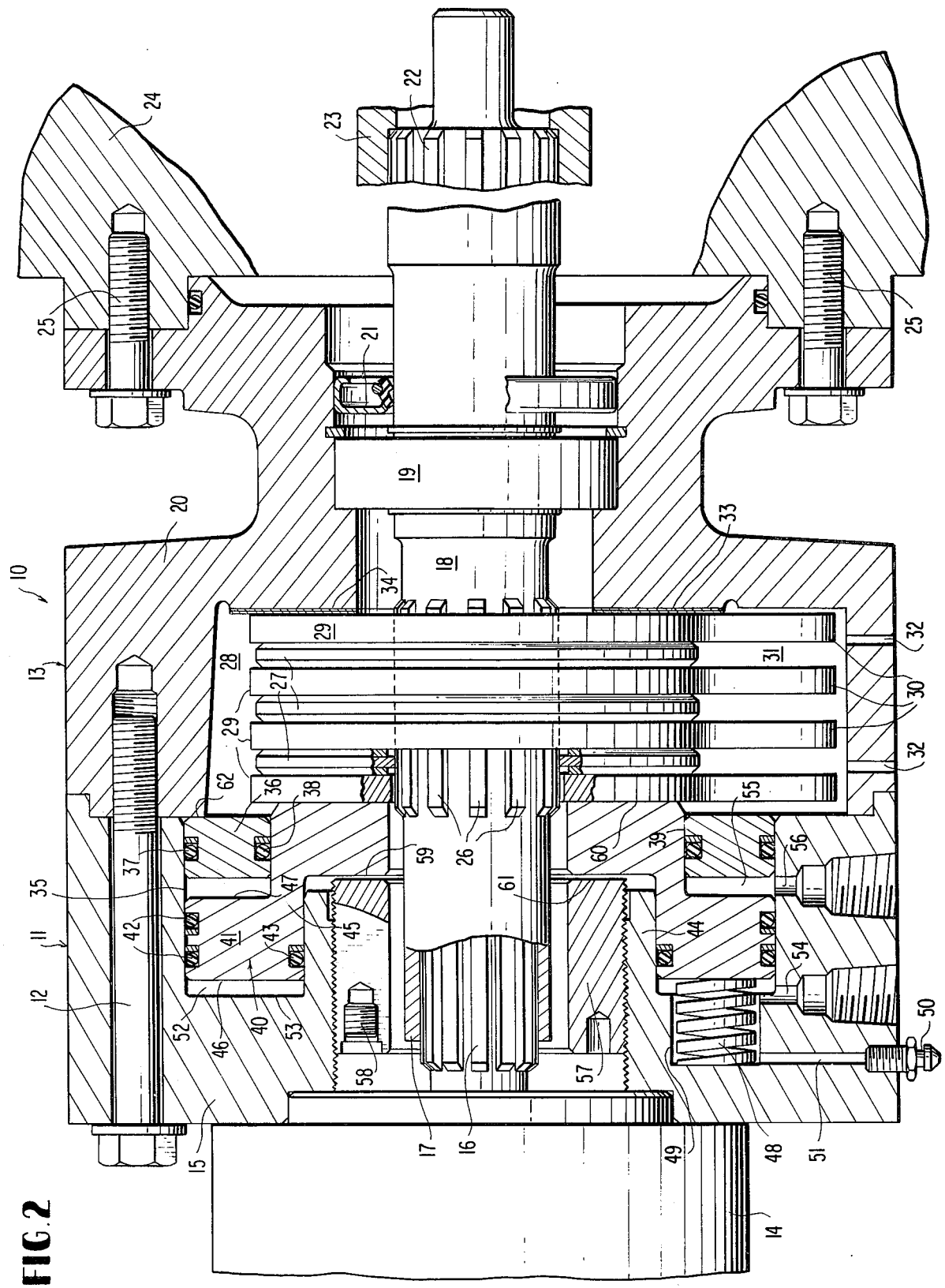
FIG. 2 is a longitudinal cross section taken on line 2—2 of FIG. 1.

Between its ends, the rotor shaft 18 has additional splines 26 thereon engaging internal splines of rotor discs 27 which are located within a dry chamber 28 of housing section 20. Arranged in alternating relationship to the rotor discs 27 are a plurality of stator discs 29 having radial extensions 30 projecting into radial anchoring cavities 31 also formed in housing section 20 and communicating with the dry chamber 28. The dry chamber 28 has vent apertures 32, as illustrated in FIG. 2. The numbers of alternating discs 27 and 29 may vary to fit the needs of given applications. Shims 33 are employed between one endmost stator disc 29 and the opposing flat annular face 34 of housing section 20 to maintain a uniform stack height for the several rotor and stator discs of the brake assembly.

The standardized hydraulic module 11 forming the essence of this invention has a main bore or cylinder chamber 35 which opens through the end of housing section 15 facing the housing section 20. Within the bore 35 is positioned a floating annular cylinder head 36 having an outer fluid seal 37 against the bore 35 and an inner fluid seal 38 against a smaller diameter portion or shoulder 39 of a disc brake control or actuating piston 40. The piston 40, which is the only piston employed in the system, has a large diameter annular portion 41 equipped with exterior seals 42 which engage the bore 35 and an inner fluid seal 43 which engages the exterior of a cylindrical hub 44 forming a part of the housing section 15. The larger and smaller diameter portions of the piston 40 are integrally connected by a radially thin skirt portion 45 lying between the hub 44 and the bore of floating cylinder head 36.

It may be noted that the area of the outermost piston end face 46 is about twenty percent greater than the area of the face 47 on the opposite side of the larger portion 41 facing the floating cylinder head 36. As will be further explained, this differential area is for system pressure compensation and to assure that the piston 40 will always be biased in the brake applying direction.

In order to bias the disc brake to an "on" condition when the crane is idle and the hydraulic system is depressurized, a plurality of circumferentially spaced compression springs 48 have corresponding ends bearing against the piston end face 46, these springs being contained within pockets 49 formed in housing section 15. A hydraulic fluid bleeder valve 50 on the module 11 communicates with one spring pocket 49 through a small radial passage 51.

Brake actuating pressure greater than normal system pressure enters the annular space 52 between piston end face 46 and the opposing surface 53 of housing section 15 via an inlet port 54. Normal system pressure, such as 200 psi, enters the annular space 55 between the floating cylinder head 36 and the opposing face 47 of the piston via a radial fluid port 56.

An adjusting collar 57 to regulate the travel of piston 40 has screw-threaded engagement with the housing section 15, as illustrated, and can be locked in selected adjusted positions by a tapered pipe plug 58 or the like. The normal travel of the piston 40 between brake applied and release positions is only about 0.015 inch. The adjusting collar 57 is also used to adjust the brake by turning the collar inwardly until it solidly contacts the piston face 59 while the piston has its innermost face 60 engagingj the first stator disc 29, followed by backing off of the collar one-quarter turn to produce the desired 0.015 inch travel space 61 for the piston 40. In FIG. 2, the brake is shown in the "on" or applied condition.

When the standardized module 11 is assembled to the brake disc module 13 and secured through bolts 12, the floating cylinder head 36 will be held captive in the bore 35 between the piston face 47 and an opposing annular surface 62 of housing section 20 which laps one end face of the floating cylinder head, as indicated. The floating cylinder head 36, in addition to defining the annular space 55, forms a sealed interface element between the dry chamber 28 of the disc sub-assembly or module and the wet chambers or spaces of the module 11.

OPERATION

Normal system pressure of 200 psi is delivered through the port 56 to the annular space 55 by a suitable pump, not shown, having an ignition switch operated solenoid valve connected therewith conventionally, so that whenever the ignition is turned off the space 55 is depressurized and the fluid is dumped by the valve back to a sump or reservoir. In such instance, as where a crane is parked out of use, the springs 48 alone maintain the disc brake safely applied.

Brake operating fluid pressure above system pressure in the space 52 is ported conventionally into the space 52. Such increased pressure under control of a brake pedal moves the piston 40 against the brake disc stack in the dry chamber 28 to apply the brake at proper times. The system pressure which continues to exist in the space 55 during brake application forms a fluid spring to soften brake action and impart an improved "feel" to the brake. When the fluid in the space 55 is thus compressed by the piston 40 during brake application, some fluid from the space 55 can return to the sump through port 56 and the associated valve and pump, not shown.

The relatively large effective area of piston face 46 compared to the smaller face 47 assures that the piston 40 will always be biased in the brake applying position regardless of any fluctuation in system pressure in the space 55. The brake has the same fail-safe capability as was disclosed in the prior copending application, above-referenced. If brake operating pressure in the space 52 should suddenly fall, the springs 48 would still have the capability of applying the disc brake. Additionally, the brake is double-acting in terms of a positive mode of operation for both active and release conditions.

The construction of the brake and particularly the construction of the module 11 is very compact in the axial direction, simple and comparatively inexpensive.

The terms and expressions which have been employed herein are used as terms of description and not of limitation, and there is not intention, in the use of such terms and expressions, of excluding any equivalents of the features shown and described or portions thereof but it is recognized that various modifications are possible within the scope of the invention claimed.

We claim:

1. In a disc brake, a brake disc sub-assembly including at least one rotor disc and a coacting stator disc, said sub-assembly including a housing section having a dry chamber for said rotor and stator discs, and a hydraulic operating module for the disc brake including a housing section attachable to the housing section of said sub-assembly, the module housing section having a bore facing said dry chamber, a disc brake operating piston in said bore including a relatively small diameter portion abutting one disc of said sub-assembly in said dry chamber and a relatively large diameter portion spaced axially away from said dry chamber, an annular interface element in said bore between the relatively large diameter portion of said piston and an opposing end face of the sub-assembly housing section, said annular interface element being externally sealed to said bore and internally sealed to said relatively small diameter portion of the piston, spring means on the module housing section engaging said piston and urging it constantly toward said one disc, there being a first annular space within the said bore of the module housing section between the enlarged diameter portion of the piston and said annular interface element, means for delivering fluid at system pressure into said first annular space, there being a second annular space within said bore between the relatively large diameter portion of said piston and an opposing surface of the module housing section, and means for delivering brake operating fluid at a pressure above system pressure into the second annular space.

2. In a disc brake as defined in claim 1, and means on the module housing section engageable with said piston to adjust the axial travel of the piston between brake "off" and brake "on" positions.

3. In a disc brake as defined in claim 2, and said last-named means comprising a threaded adjusting collar mounted within a threaded bore in a hub portion of the module housing section inwardly of the relatively large diameter portion of the piston, an end face of said adjusting collar being in axially opposed relation to the relatively small diameter portion of the piston on the end face of such portion away from said one disc.

4. In a disc brake as defined in claim 3, and said relatively large diameter portion of the piston being in fluid sealed relationship to said bore of the module housing section and the periphery of said hub portion.

5. In a disc brake as defined in claim 1, and a shaft carrying said rotor disc and being journaled in a bearing within the sub-assembly housing section, such housing section including means engaged with said stator disc and resisting rotation thereof with said shaft.

6. In a disc brake as defined in claim 5, and said last-named means comprising a radial extension on said stator disc and a coating radial recess in the sub-assembly housing receiving said radial extension.

7. In a disc brake as defined in claim 1, and a radially narrow web on said piston integrally connecting said relatively small and relatively large diameter portions of the piston and forming the interior annular wall of said first annular space.

8. In a disc brake as defined in claim 3, and a radially narrow web on said piston integrally connecting said relatively small and relatively large diameter portions of the piston and forming the interior annular wall of said first annular space.

9. In a disc brake as defined in claim 5, and said shaft including splined opposite end portions adapted for coupling to a driving motor at one end of the disc brake and to a speed reducer at the other end of the disc brake.

10. In a disc brake as defined in claim 1, and said module housing section having an end face abutting the end face of the sub-assembly housing section, said annular interface element being in abutment with the last-named end face.

11. A disc brake comprising a variable configuration disc sub-assembly including a housing section, a rotational shaft journaled on the housing section and alternating rotor and stator discs in a dry chamber of said housing section with the rotor discs connected to said shaft and the stator discs connected to said housing section, and a standardized hydraulic operating module for the disc brake including a module housing section, means coupling the module housing section to the sub-assembly housing section in end-to-end relationship, the module housing section having a bore in substantial registration with said dry chamber, an annular interface element in said bore and abutting an end face of the sub-assembly housing section, a disc brake operating piston in said bore and spaced axially from the annular interface element and having a reduced diameter portion engaged through the bore of the interface element and abutting an endmost disc of said sub-assembly in said dry chamber, spring means in the module housing section engaging said piston and biasing it toward engagement with said endmost disc, means to deliver piston cushioning fluid at a first pressure into a space between said piston and said interface element, and means to deliver disc brake operating fluid at a pressure above the pressure of the cushioning fluid into a space between said piston and an end wall of said bore in the module housing section at the end of the piston away from the interface element.

12. A disc brake as defined in claim 11, and means on the module housing section engageable with said piston and operable to adjust the axial travel of the piston.

* * * * *